M. G. ZOELLER.
TRACTOR.
APPLICATION FILED JAN. 5, 1917.

1,294,748.

Patented Feb. 18, 1919.
3 SHEETS—SHEET 1

WITNESSES
John M. Dobie
J. B. Schott

INVENTOR
Milton G. Zoeller

BY Richard B. Owen
ATTORNEY

M. G. ZOELLER.
TRACTOR.
APPLICATION FILED JAN. 5, 1917.
1,294,748.
Patented Feb. 18, 1919.
3 SHEETS—SHEET 2.
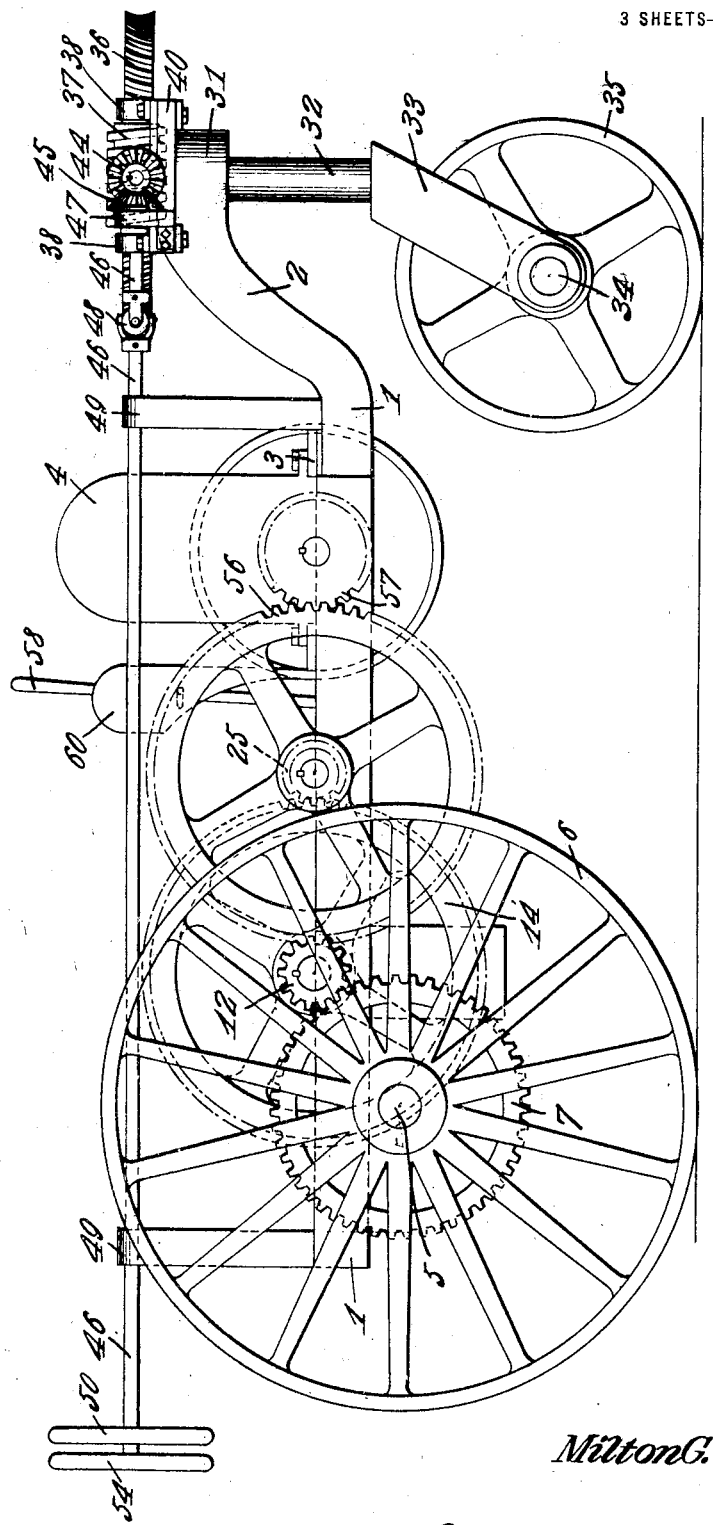
WITNESSES
John M. Dobie
J. S. Schrott
INVENTOR
Milton G. Zoeller,
BY Richard B. Owen.
ATTORNEY

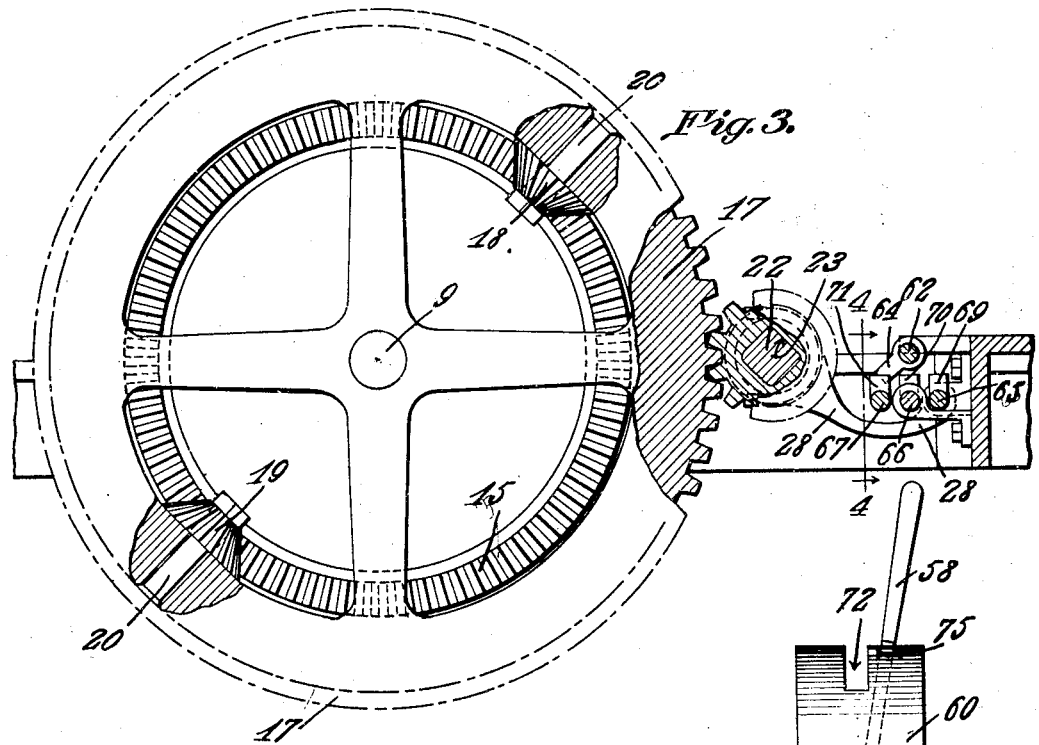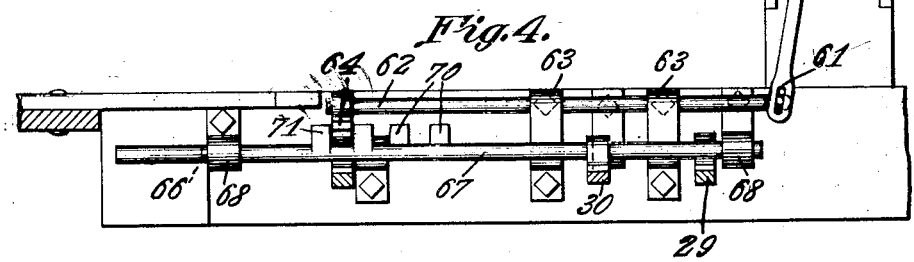

UNITED STATES PATENT OFFICE.

MILTON G. ZOELLER, OF PRESTON, NEBRASKA.

TRACTOR.

1,294,748.	Specification of Letters Patent.	Patented Feb. 18, 1919.

Application filed January 5, 1917. Serial No. 140,771.

*To all whom it may concern:*

Be it known that I, MILTON G. ZOELLER, a citizen of the United States, residing at Preston, in the county of Richardson and State of Nebraska, have invented certain new and useful Improvements in Tractors, of which the following is a specification.

My invention relates to improvements in tractors, and it consists in constructions, combinations, and arrangements herein described and claimed.

An object of my invention is to provide a tractor by which agricultural implements such as gangplows, cultivating machinery, etc., as well as wagon trains, may be drawn, the tractor embodying facilities whereby the steering caster wheel may be released so that the tractor may be turned practically within its own length, one or the other of the power or tractor wheels being at such time disconnected from the source of driving power.

Another object of the invention is to provide a novel arrangement of differential driving mechanism for the tractor wheels.

Another object of the invention is to provide a novel gear shifting mechanism in association with the differential drive mechanism.

Other objects and advantages will appear from the following specification, reference being had to the accompanying drawings forming a part thereof, in which:

Figure 1 is a plan view of the tractor,

Fig. 3 is a cross section of a portion of the device taken substantially on the line 3—3 of Fig. 1, and Fig. 4 is a section on the line 4—4 of Fig. 3 illustrating the arrangement of the gear shifting mechanism.

Figure 2:
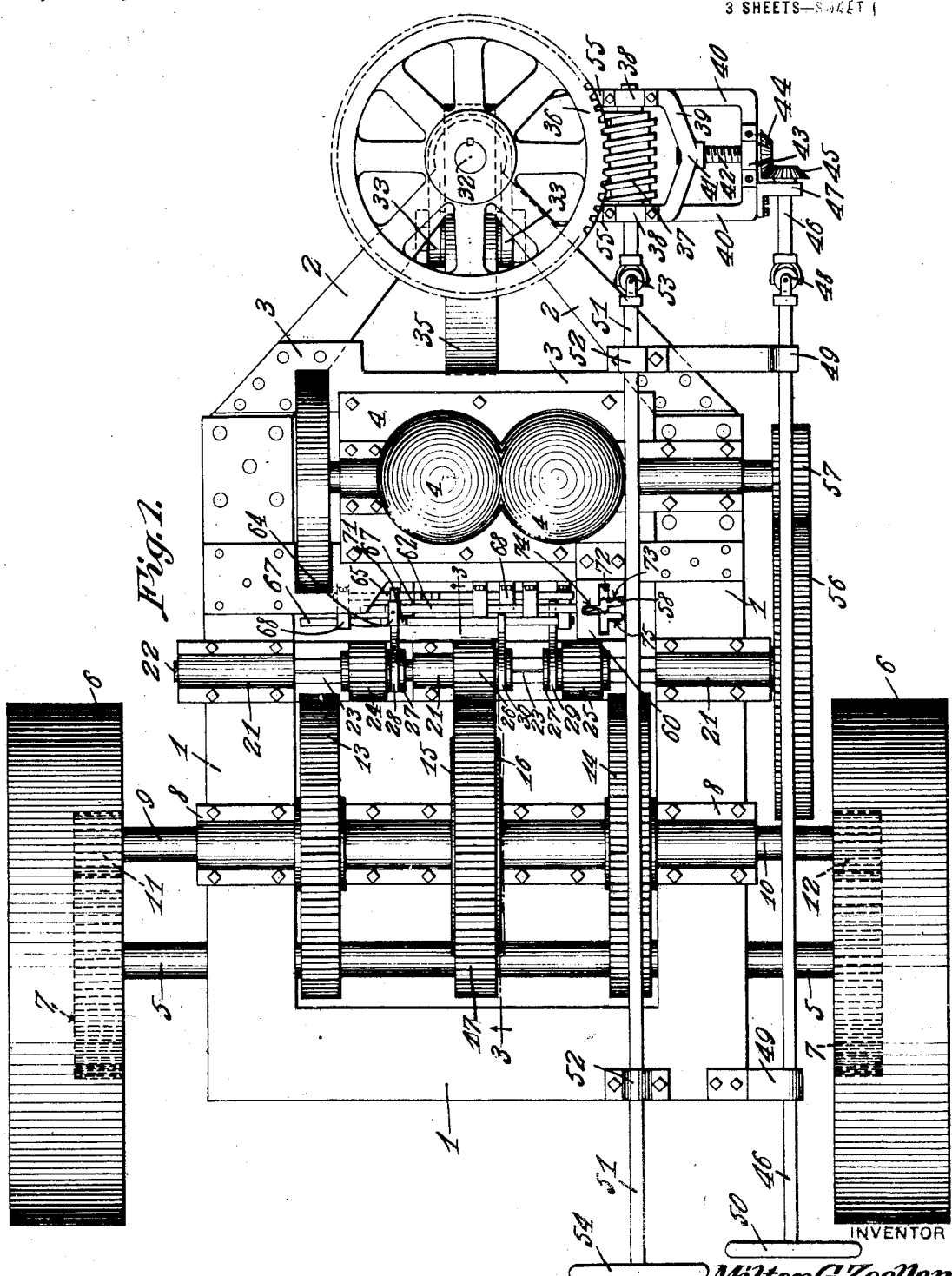
Fig. 2 is a side elevation thereof.

In carrying out my invention I provide a main supporting frame 1 which is preferably constructed of channel iron so that it may have the required strength and rigidity. Formed integrally therewith or secured thereto in any suitable manner at the front end of the frame 1, are forwardly converging and upwardly extending caster supporting members 2.

Arranged near the front end of the tractor is a platform 3, on which a motor 4 is supported, the platform 3 aiding to brace the front end of the tractor frame 1. Supported in suitable bearings at the rear end of the tractor frame 1, is a driven supporting axle 5. Mounted on the ends of the axle 5 are ground or tractor wheels 6 which, although not so shown in the drawings, may be provided with suitable spikes or other ground engaging elements.

A gear wheel 7 is secured to the axle 5 adjacent each tractor wheel 6, and is arranged to be driven in a manner presently to be explained. Journaled in bearings 8 which are mounted on the upper surface of the tractor frame 1 as shown in Fig. 1, is a drive shaft which consists of the members 9 and 10. The drive shaft is formed in two lengths as will be inferred from the above statement, the inner ends of the shaft abutting each other at the center of the machine. The outer ends of the shaft or the members 9 and 10, are provided with driving pinions 11 and 12 respectively. The pinions 11 and 12 intermesh with the gears 7 on the tractor wheels 6, and drive either one or both of the tractor wheels according to the particular adjustment of the gear shifting mechanism hereinafter to be described, and according to the manner in which it is desired to drive the tractor.

Fixedly secured to the shafts 9 and 10 are gears 13 and 14 respectively. Secured also to the shafts 9 and 10 adjacent their abutting ends, are beveled gears 15 and 16 respectively. The gear 15 is clearly shown in Fig. 3 from which it will also be observed that a third gear is loosely journaled on the ends of the shafts 9 and 10 which project inwardly from the hubs of the bevel gears 15 and 16 for this purpose.

It will be seen that the third gear above referred to, is a spur gear 17. The gear 17 is provided with diametrically oppositely disposed bevel pinions 18 and 19 which are mounted on studs 20 suitably embedded in the rim of the gear 17. The pinions 18 and 19 mesh with the bevel gears 15 and 16 on the respective shafts 9 and 10, and under a certain adjustment of the driving mechanism, serve as locking members and drive both bevel gears 15 and 16 as a unit. This position of the driving mechanism is illustrated in Fig. 1, and from the description of this portion of the device, namely the gears 15 and 16 and the pinions 18 and 19, it will be seen that these parts may act as a differential driving mechanism. This will however, be more fully explained.

Journaled in bearings 21 on the tractor frame 1 is a main drive shaft 22. The drive shaft 22 is provided at places adjacent the gears 13 and 14, with squared portions 23, it being understood that the portions of the shaft 22 mounted in the journals 21, are circular.

Slidable on the squared portions 23 of the shaft 22 adjacent the gears 13 and 14 are driving pinions 24 and 25 respectively. Slidable on the squared portion 23 of the shaft adjacent the central third gear 17, is a third driving pinion 26. Each of the gears 24, 25, and 26 is provided with a shifting collar 27. Engaging an annular groove in each of the collars 27 of the pinions 24, 25 and 26, is a shifting yoke 28, 29 and 30 respectively. The shifting yokes just referred to are a portion of a gear shifting mechanism presently to be described.

Reference is now directed to the forward portion 2 of the tractor. It will be observed that the portions 2 terminate in a bearing hub 31. Rotatably mounted in the hub 31 is a caster supporting shaft 32. Mounted on the lower end of the shaft 32 is a yoke 33 which supports a bearing pin 34 on which the caster 35 is supported.

Keyed to the upper end of the shaft 32 is a worm gear 36. A driving worm pinion 37 meshes with the gear 36 at one side thereof as clearly illustrated in Fig. 1. The pinion 37 is adapted to be moved out of engagement with the gear 36 when it is desired to make a complete turn of the tractor within its own length in a manner presently to be explained. The worm pinion 37 is mounted in journals 38 which form a part of a slidable arch 39. The arch 39 is slidably supported on a lateral extension 40 on the hub 31 of the forwardly extending portions 2 of the tractor frame 1.

The arch 39 terminates in a threaded hub 41 with which a screw shaft 42 engages. The screw shaft 42 is swivelly mounted in a bearing 43 and is provided with a bevel pinion 44 at its outer end. An intermeshing bevel pinion 45 mounted on the end of an actuating shaft 46 is supported in engagement with the pinion 44 by a bracket 47. A universal joint 48 is interposed in the length of the shaft 46 adjacent the bracket 47 to take up vibrations of the shaft 45, when the tractor is in use, although if it is so desired the joint 48 may be eliminated and the shaft constructed in one piece.

It will be seen from the construction shown in Fig. 1, that the portion of the shaft 46 extending rearwardly from the joint 48 is mounted in brackets 49 extending from the frame 1. The shaft 46 terminates in a hand wheel 50.

The worm pinion 37 is rotated by a shaft 51 which is mounted in bearings 52, and is provided with a universal joint 53 as well as a hand wheel 54. It is obvious the joint 53 allows the worm 37 to be moved outwardly on the extension 40, since the joint permits the forward end of the shaft 51 to swing to accommodate the movement of the worm. It has been stated that the arch 39 is movable on the frame extension 40. It has also been explained that the movement of the arch 39 is accomplished by the rotation of the pinions 44 and 45. The arch 39 is limited in its inward movement toward the worm gear 36, by stops 55. When it is desired to cause the tractor to turn within its own length, the shaft 46 is rotated to in turn slide the arch over the frame 40 and retract the pinion 37 from engagement with the gear 36. One or the other of the pinions 24 or 25 is moved into engagement with its companion gear 13 or 14 respectively, while the pinion 26 is moved from engagement with the central gear 17, and upon rotating the driving shaft 22 one or the other of the tractor wheels will form the driving element. The other tractor wheel will then be free and upon operation of the motor the tractor will be driven forward. The caster being at the same time free will be caused to turn in its pivotal support in the hub 31 and the tractor will thus turn completely around.

The driving shaft 22 is provided with a driven gear 56 at one end with which a driving pinion 57 on the shaft of the motor 4, engages. While such provision is not illustrated it is obvious that a suitable clutch mechanism will be provided on the motor shaft. It has just been stated that the pinions 24, etc., are moved into engagement with their respective gears 13, etc., respectively. This is accomplished by the various yokes in engagement therewith.

The various yokes 28, 29 and 30, are shifted by a lever 58. The lever 58 which is clearly shown in Fig. 4, is supported in a universal joint 59 in a rack frame 60. The purpose of the connection of the shaft 58 with the universal joint 59, is to provide a means whereby the shaft 58 may be shifted forwardly or backwardly, or sidewise. The lower end of the shaft 58 is provided with a slot 61 with which a pin mounted on the end of the shifting rod 62 engages.

The shifting rod 62 is mounted in bearings 63 and is provided at its other extremity with a shifting lug or dog 64. Disposed beneath the shifting rod 62, are three shifting shafts 65, 66, and 67 on which the shifting yokes 28, 29 and 30 are mounted, respectively. The shifting shafts above referred to are slidably mounted in bearings 68 on the frame of the machine, and each of the respective shafts 65, 66 and 67 is provided with a slotted projection 69, 70 and 71.

By reference to Fig. 4 it will be seen that the slotted projection 71 of the rearward shifting shaft 67 has been engaged by the lug 64 of the shifting rod 62. Since the shifting shaft 67 is the one which carries the yoke 30 and coöperates with the pinion 26, it will readily be seen that a movement of the lever 58 will cause the pinion 26 to be shifted from engagement with the central gear 17.

The rack frame 60 is provided with a slot 72 disposed transversely of the shifting rod 62. Merging with the slot 72 are recesses 73 and 75 at one side thereof, and a single recess 74 at the other side thereof. The recess 74 is arranged centrally of the recesses 73 and 75. The distance between the recesses 73 and 75 represents the arcuate sweep of the lug 64 on the shifting rod 62. This holds true so far as the engagement of the lug 64 with the extreme slotted projections 69 and 71 is concerned. When the lever 58 rests in the recess 73, the lug 64 will be in engagement with the projection 71 of the shaft 67, and the pinion 26 will have been moved into engagement with the gear 17. The subsequent action of the tractor has been previously referred to, but in order to make the operation thereof more clear, the subsequent working of the parts takes place.

The operation of the device is now as follows: The shaft 22 upon being rotated by the operation of the motor 4, drives the pinion 26, (in fact rotates all of the pinions on the shaft) and rotates the central gear 17. The pinions 18 and 19 (see Fig. 3) simply act as driving elements and carry the bevel gears 15 and 16 around. The shaft members 9 and 10 are thus rotated as a unit and the tractor wheels 6 caused to move over the ground.

The pinions 24 and 25 being free, are held so until one or the other is selected by the lug 64 of the shifting rod 62. This is accomplished as follows. When the lever 58 is moved out of its recess 73 until it reaches the transverse slot 72, the movement thereof will cause the shifting rod 62 to move downwardly in Fig. 1 thus carrying the shaft 67, the yoke 30, and the pinion 26 therewith. The pinion 26 is thus slid over the adjacent squared portion of the shaft and the connection therebetween and the gear 17, broken.

The lever 58 is now moved toward the left a slight distance until it alines with the recess 74. It should be observed that the act of restoring the shaft 67 to its normal position, brought the slotted projection 71, 70, and 69 into lateral alinement. The lever 58 being now stationed at the entrance of the recess 74 is moved therein. The act of shifting the lever 58 within the recess 72 to the recess 74, caused the rotation of the shifting rod 62 so that the lug 64 moved into engagement with the slotted projection 70, of the shaft 66.

The subsequent act of pushing the lever 58 into the recess 74 caused the shaft 66 to be moved downwardly in Fig. 1 thus carrying the yoke 29 therewith. The pinion 25 was thus slid over the adjacent squared portion of the shaft 22 into engagement with the gear 14. Upon rotation of the drive shaft 22 the gear 14 was driven and the corresponding tractor wheel 6 was made the driving element. Upon suitable adjustment of the caster 35, the tractor was caused to move in a direction toward the left.

The movement of the lever 58 back to the transverse slot 72 caused the restoration of the shaft 66 to its normal position, together with its associated parts. Upon moving the lever 58 into the recess 75, the shaft 65 is brought into action and the pinion 24 and gear 13 moved into engagement. When the lever 58 is moved to the base of the slot 72 at the right hand end in Fig. 1, the lug 64 is moved out of engagement with the projections on the various shafts, and the parts are then in a neutral position. It should be explained that the lever 58 is fulcrumed on the shifting rod 62 at its point of connection 61, as regards the movement of the lever in the slot 72. For this purpose, provision is made in the universal joint 59 to allow for the movement of the lever. At the same time, the joint 59 is the pivotal point for the lever 58 as regards its movement into and out of the recesses 73, etc.

I wish to state and emphasize particularly, that the frequent danger of the stripping of gears, due to the engagement of more than one pair of driving gear elements, as is common in devices of this character, is entirely obviated in my device. This is so because of the peculiar coaction of the lever 58 with the various recesses 73, etc., and the shifting rod 62 and the gear shifting shafts. By this arrangement when one of the pinions on the driving shaft 22 is in engagement with its companion gear, the other pinions run free on the shaft and thus the danger of stripping any of the gears is prevented.

While the construction of the device is that of a preferred form, obviously various modifications and changes may be made without departing from the spirit of the invention and the scope of the claims.

I claim:

1. In a tractor, the combination of a frame, ground wheels, a driven shaft for each ground wheel, a gear on each driven shaft, a differential gear common to both driven shafts, a drive shaft, a pinion on the drive shaft for each of the driven shaft gears, said pinions and gears being normally out of engagement, a shifting shaft for each pinion, a connection between each shifting shaft and the associated pinion, a shifting rod for the shifting shafts, and selectively operated means joined with the shifting rod adapted to engage one of the shifting shafts and move its associated pinion into engagement with its corresponding gear on the driven shafts.

2. In a tractor, the combination of a frame, ground wheels, a driven shaft for each ground wheel, a gear on each driven shaft, a differential gear common to both driven shafts, a drive shaft, a pinion on the drive shaft for each of the driven shaft gears, a shifting shaft for each pinion, a yoke connection between each shifting shaft and the associated pinion, a shifting rod for the shifting shafts, a selectively operated lever joined with the shifting rod adapted to engage one of the shifting shafts and move its associated pinion into engagement with its corresponding gear on the driven shafts, and means for locking the lever to its adjustments.

3. In a tractor, the combination of a frame, ground wheels, a driven shaft for each ground wheel, a gear on each driven shaft, a differential gear common to both driven shafts, a drive shaft, a pinion on the drive shaft slidably engageable with each of the driven shaft gears, a shifting shaft for each pinion, a yoke connection between each shifting shaft and the associated pinion, a shifting rod for the shifting shafts, a lever joined with the shifting rod and adapted to connect the shifting rod with one of the shifting shafts and move its associated pinion into engagement with its corresponding gear on the driven shafts, a support for the lever, said support having engageable recesses for the lever to retain the lever in its adjustments.

4. In a tractor, ground wheels, a joining axle, a frame supported thereon, a driven shaft for each of the ground wheels the ends of the driven shafts abutting, a differential gear common to both driven shafts, a gear on each driven shaft, a drive shaft, a motor for the drive shaft, shiftable pinions on the drive shaft one for each gear on the driven shafts, said pinions being normally out of engagement therewith, a shifting shaft for each pinion, a slotted projection on each shifting shaft, a yoke connection between each shifting shaft and the associated pinion, a shifting rod having a lug said rod being rotatably slidable over the shifting shafts the lug being adapted to engage one of the slotted projections, a lever joined with the shifting rod, a mounting having a transverse slot and lateral recess merging therewith the end of the lever being arranged to move in the transverse slot and into the lateral recesses, the radial position and engagement of the shifting rod lug being governed by the disposition of the lever in the recesses, and a universal support for the lever whereby the transverse and lateral movement of the lever may be transferred to the shifting rod.

5. In a tractor, the combination of a frame, ground wheels, a driven shaft for each ground wheel, a gear on each driven shaft, a differential gear common to both driven shafts, a drive shaft, a pinion on the driven shafts, a drive shaft, a pinion on the drive shaft for each of the gears of the driven shafts, said pinions and gears being normally out of engagement, a shifting shaft for each pinion, a connection between each shifting shaft and the associated pinion, means for shifting said shafts, and selectively operated means connected to the last mentioned means adapted to coöperate to move one of the shifting shafts and move its associated pinion into engagement with the corresponding gear on the driven shaft.

6. In a tractor, the combination of a frame, ground wheels, a driven shaft for each ground wheel, a gear on each driven shaft, a differential gear common to both driven shafts, a drive shaft, a pinion on the drive shaft for each of the driven shaft gears, a shifting shaft for each pinion, a yoke connection between each shifting shaft and the associated pinion, a shifting rod for the shifting shafts, a selectively operated lever joined with the shifting rod adapted to engage one of the shifting shafts and move its associated pinion into engagement with its corresponding gear on the driven shafts.

7. In a tractor, the combination of a frame, ground wheels, a driven shaft for each ground wheel, a gear on each driven shaft, a differential gear common to both driven shafts, a drive shaft, a pinion on the drive shaft slidably engageable with each of the driven shaft gears, a shifting shaft for each pinion, a yoke connection between each shifting shaft and the associated pinion, a shifting rod for the shifting shafts, a lever joined with the shifting rod and adapted to connect the shifting rod with one of the shifting shafts and move its associated pinion into engagement with its corresponding gear on the driven shafts, and a support for said lever.

In testimony whereof I affix my signature in presence of two witnesses.

MILTON G. ZOELLER.

Witnesses:
 J. R. BILES,
 W. A. GREENWALD.